United States Patent [19]

Chong

[11] Patent Number: 6,070,251
[45] Date of Patent: *May 30, 2000

[54] METHOD AND APPARATUS FOR HIGH AVAILABILITY AND CACHING DATA STORAGE DEVICES

[75] Inventor: Fay Chong, Cupertino, Calif.

[73] Assignee: Sun Microsystems, Inc., Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/883,923

[22] Filed: Jun. 26, 1997

[51] Int. Cl.[7] .......................... H02H 3/05; H03K 19/003
[52] U.S. Cl. ................................. 714/12; 714/13
[58] Field of Search ........................... 395/182.11, 182.1, 395/182.09, 182.08, 182.04, 182.05; 714/13, 12, 10, 11, 6–7

[56] References Cited

U.S. PATENT DOCUMENTS

| | | | |
|---|---|---|---|
| 5,136,498 | 8/1992 | McLaughlin et al. | 364/184 |
| 5,142,470 | 8/1992 | Bristow et al. | 364/184 |
| 5,168,443 | 12/1992 | McLaughlin et al. | 364/187 |
| 5,202,822 | 4/1993 | McLaughlin et al. | 364/187 |
| 5,210,756 | 5/1993 | Kummer et al. | 371/8.1 |
| 5,255,388 | 10/1993 | McLaughlin et al. | 395/600 |
| 5,398,331 | 3/1995 | Huang et al. | 714/12 |
| 5,574,950 | 11/1996 | Hathorn et al. | 395/861 |
| 5,588,110 | 12/1996 | DeKoning et al. | 395/182.03 |
| 5,592,618 | 1/1997 | Micka et al. | 714/54 |
| 5,615,329 | 3/1997 | Kern et al. | 714/6 |
| 5,651,110 | 7/1997 | Powers et al. | 395/182.05 |
| 5,696,895 | 12/1997 | Hemphil et al. | 395/182.02 |
| 5,712,970 | 1/1998 | Arnott et al. | 395/182.04 |
| 5,720,028 | 2/1998 | Matsumoto et al. | 395/182.07 |
| 5,724,501 | 3/1998 | Dewey et al. | 395/182.07 |
| 5,734,818 | 3/1998 | Kern et al. | 714/20 |
| 5,742,792 | 4/1998 | Yanai et al. | 395/489 |
| 5,761,705 | 6/1998 | Dekoning et al. | 711/113 |

FOREIGN PATENT DOCUMENTS

| | | |
|---|---|---|
| 0 747 822 A2 | 12/1996 | European Pat. Off. . |
| 60-007548 | 1/1985 | Japan . |
| WO 97/07458 | 2/1997 | WIPO . |

OTHER PUBLICATIONS

Robert W. Kembel, "In–Depth Fibre Channel Arbitrated Loop." published by Northwest Learning Associates for Solution Technology, 1996, ISBN 0–0931836–81–6, XP002055479, USA, twenty–four (24) pages.

*Primary Examiner*—Dieu-Minh T. Le
*Attorney, Agent, or Firm*—O'Melveny & Myers

[57] ABSTRACT

A method and apparatus for high availability and caching data storage devices. According to a preferred embodiment of the invention, there is provided an apparatus. The apparatus comprises a primary controller, a secondary controller having the same address as that of the primary controller, a switching circuit coupled to the primary and secondary controllers, and a control circuit coupled to the switching circuit. According to this preferred embodiment of the invention, in a normal operation, the control circuit sets the switching circuit so that the primary controller receives and responds to input data supplied from a host, and the secondary controller receives the input data. In a fail-over operation in which the primary controller fails, the control circuit sets the switching circuit so that the primary controller is disabled, and the secondary controller receives and responds to the input data supplied from the host. The fail-over is transparent to the host. The apparatus may further comprise a data storage device coupled to both the primary and secondary controllers. An alternative preferred embodiment of the invention is also provided.

16 Claims, 4 Drawing Sheets

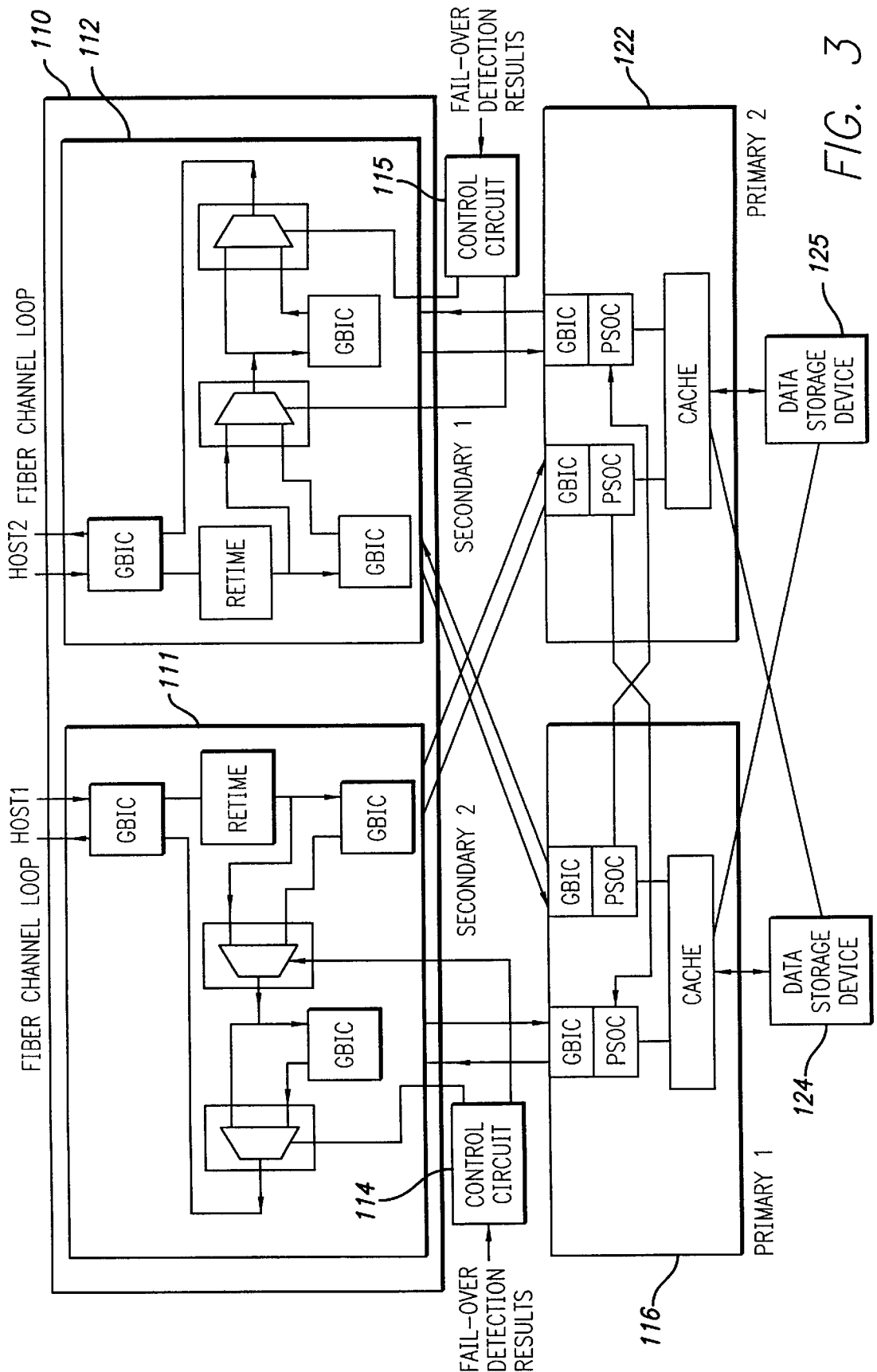

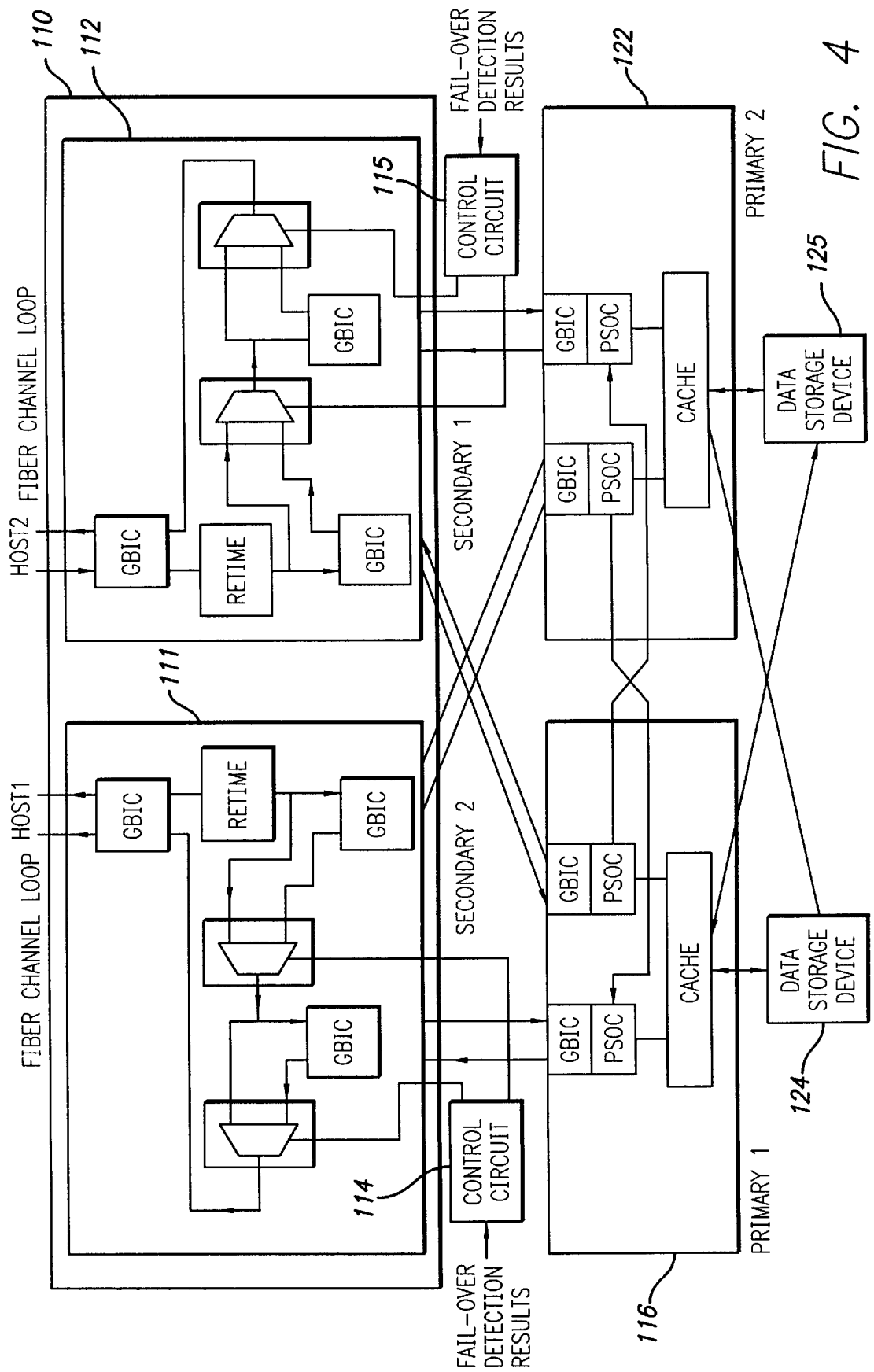

METHOD AND APPARATUS FOR HIGH AVAILABILITY AND CACHING DATA STORAGE DEVICES

The present invention generally relates to a method and apparatus for high availability and caching data storage devices, and more particularly to a method and apparatus that performs efficient caching operations and allows fail-over (i.e., switch-over) in controllers and/or data storage devices to be transparent to a server or a host computer.

BACKGROUND OF THE INVENTION

In a typical client-server system, a plurality of clients are coupled to one or more servers, which are in turn coupled to one or more data storage devices. The clients can access files in the data storage devices through associated servers. To maintain high data communication performance, high availability and efficient cache operations are important to data storage devices. To achieve these goals, fail-over in data storage devices has been implemented and commercially available for a number of years. However, conventional implementations require software running in the server (or host computer) to redirect the I/O from the server over an alternate path or the same path but to a different data storage device address, i.e., a secondary address. Different vendors typically have different types of software for controlling fail-over operations in data storage devices. In a typical corporate environment, equipment from multiple vendors may be used to set up a client-server system. The server of one vendor may include fail-over software that is incompatible with the data storage devices of another vendor. In such a situation, in order to properly set up the system, extensive testing to resolve incompatibility problems is often required. As a result, it is very inefficient and time-consuming to set up such a system. One way to solve the incompatibility problem is to always purchase equipment from the same vendor. However, this would lead to inflexibility in selecting equipment and future upgrading the system. Restricting hardware buyers to a single vendor also incur high costs.

Therefore, there exists a need for a method and apparatus for high availability and caching data storage devices that allows fail-over in the controllers and/or data storage devices to be transparent to a server so that extensive testing to resolve incompatibility between equipment of different vendors can be substantially minimized.

SUMMARY OF THE INVENTION

The present invention provides a method and apparatus for high availability and caching for data storage devices. According to a preferred embodiment of the present invention, there is provided an apparatus comprising a primary controller, a secondary controller having the same address as that of the primary controller, a switching circuit coupled to the primary and secondary controllers, and a control circuit coupled to the switching circuit. According to this preferred embodiment of the invention, in a normal operation, the control circuit sets the switching circuit so that the primary controller receives and responds to input data supplied from a host, and the secondary controller receives the input data. In a fail-over operation in which the primary controller fails, the control circuit sets the switching circuit so that the primary controller is disabled, and the secondary controller receives and responds to the input data supplied from the host. The apparatus may further comprise a data storage device coupled to both the primary and secondary controllers.

According to a second preferred embodiment of the invention, there is provided an apparatus, responsive to first and second hosts, for high availability and caching data storage devices. The apparatus comprises first and second controllers, a switching circuit set, and a control circuit. The first controller includes a first primary controller and a second secondary controller and the second controller includes a second primary controller and a first secondary controller. The first secondary controller is a backup of the first primary controller; and the second secondary controller is a backup of the second primary controller. The first and second controllers are coupled to the switching circuit set which is coupled to the control circuit. According to this alternative preferred embodiment of the invention, in a normal operation, the control circuit sets the switching circuit set so that the first primary controller receives and responds to input data supplied from the first host, and the first secondary controller receives the input data from the first host. Moreover, the second primary controller receives and responds to input data supplied from the second host, and the second secondary controller receives the input data from the second host.

According to this alternative preferred embodiment, in a fail-over operation in which one of the first and second controllers fails, the control circuit sets the switching circuit set so that the primary controller in the failing controller is disabled, and the secondary controller in the surviving controller receives and responds to the input data directed to the primary controller in the failing controller. In this fail-over operation, the primary controller in the surviving controller receives and responds to the input data directed to the surviving controller. The apparatus may also comprise first and second data storage devices each coupled to both first and second controllers.

Other attainments, together with a fuller understanding of the invention will become apparent and appreciated by referring to the following description and claims taken in conjunction with the accompanying drawings.

BRIEF DESCRIPTION OF THE DRAWINGS

FIG. 3 shows an alternative preferred embodiment of the invention and further illustrates a normal operation for this alternative embodiment; and FIG. 4 illustrates a fail-over operation for the embodiment of FIG. 3.

DETAILED DESCRIPTION OF PREFERRED EMBODIMENTS

Figure 1:
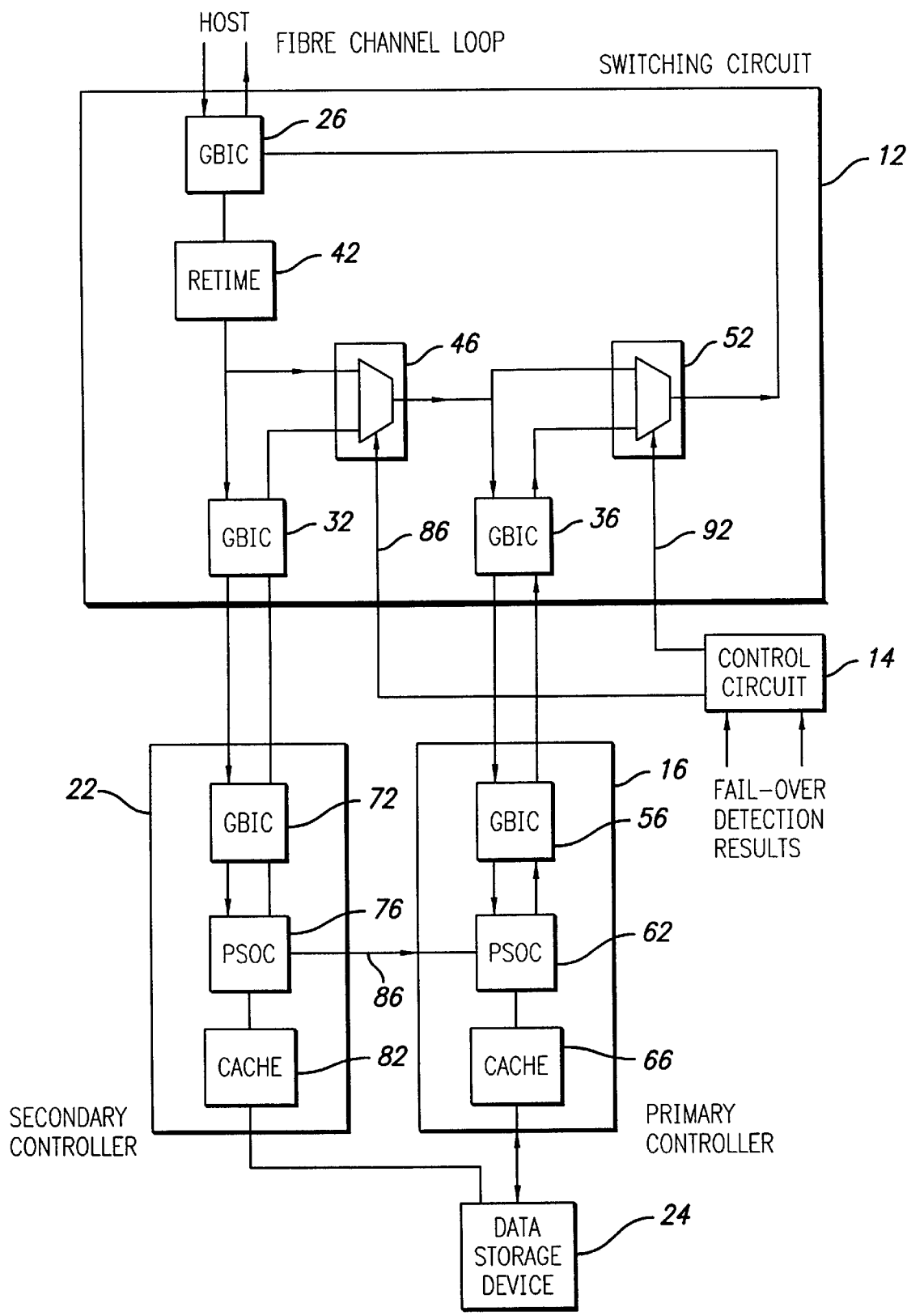
FIG. 1 shows a functional block diagram of a preferred embodiment of the invention and further illustrates a normal operation for the embodiment.

FIG. 1 shows a functional block diagram of a fiber channel circuitry for high availability and caching data storage devices according to a preferred embodiment of the invention. The invention may be implemented in electronic circuitry. As illustrated, a switching circuit 12 is coupled to a control circuit 14, a primary controller 16 and a secondary controller 22. Primary and secondary controllers are in turn coupled to a data storage device 24. Switching circuit 12 includes GBICs (Gigabit Interface Converters) 26, 32, 36, retime circuit 42 and multiplexers 46 and 52. Primary and secondary controllers 16 and 22 are identical to each other in this embodiment. Primary controller 16 includes a GBIC 56, a PSOC (Serial Optical Converter for PCI Bus) 62 and a cache 66. Similarly, secondary controller 22 includes a GBIC 72, a PSOC 76 and a cache 82. Also included in each of primary and secondary controllers 16 and 22 is fail-over software (not shown) which detects whether there is a failure in itself, the other controller, or data storage device 24. The Sun Energizer may be used as the fail-over software and is commercially available from Sun Microsystems, Inc., in Mountain View, Calif. The fail-over detection results are sent to control circuit 14 to control multiplexers 46 and 52 via control lines 86 and 92, respectively. Each GBIC is a conventional interface converter and is commercially available, for example, from Vixel Corporation in Lynnwood, Wash. Retime circuit 42 is also a conventional circuit that provides alignment of data pulses and converts pulse edges to discrete boundaries. Each PSOC includes a buffer for storing input data received from the host and transfers the data from its buffer to its cache in accordance with, for example, the Arbitrated Loop standards, as defined in X3T11/Project 755D/Rev 4.3 or T11/Project 1133D/Rev 5.4 by American National Standards Institute (ANSI), which is hereby incorporated by reference. As an alternative to a PSOC, an ISP2100 Intelligent Fibre Channel Processor may be used and is commercially available from QLogic Corporation, in Costa Mesa, Calif. Input data in the form of fiber channel frames are sent to primary and secondary controllers 16 and 22 and data storage device 24 via a fiber channel loop in accordance with the Arbitrated Loop standards, for example. Both primary and secondary controllers 16 and 22 have the same address.

Normal operation is illustrated in FIG. 1. In FIG. 1, multiplexer 52 is set by control circuit 14 so that primary controller 16 and data storage device 24 are active on the fiber channel loop. Fiber channel frames supplied from the host are sent to primary controller 16, which then responds on the loop by returning status information, etc. Frames addressed to data storage device 24 are passed through PSOC 62 via cache 66. In the normal operation, the data on the loop is also received by secondary controller 22 and data storage device 24. However, multiplexer 46 is set by control circuit 14 so that secondary controller 22 cannot respond on the loop. Since both primary and secondary controllers have the same address, this effectively allows secondary controller 22 to be in a "wire tap" mode, i.e., it "listens" to the messages going to primary controller 16. Since both primary and secondary controllers 16 and 22 receive the same data, both caches 66 and 82 are filled at the same time in response to write commands from the host. The data flow is illustrated by the arrows in FIG. 1.

Synchronization between PSOCs 62 and 76 is needed for several reasons. A main reason is to prevent data over-run condition from occurring in the buffers of the PSOCs. The synchronization is accomplished via a communication link 86. When there is space available in a buffer of PSOC 76, PSOC 76 sends a request for additional data to PSOC 62. If PSOC 62 also has space available in its buffer, PSOC 62 will notify the host about the additional space available. Also, at the end of a command it receives, secondary controller 22 returns a pending status of the command to primary controller 16. Primary controller 16 will, at the end of the command received by itself, return a pending status of the command to the host. Additionally, when a command has been processed by secondary controller 22 so that it is ready to receive additional data, secondary controller 22 will send a request to primary controller 16. When primary controller 16 has also processed the command, it will send a request to the host for additional data.

Figure 2:
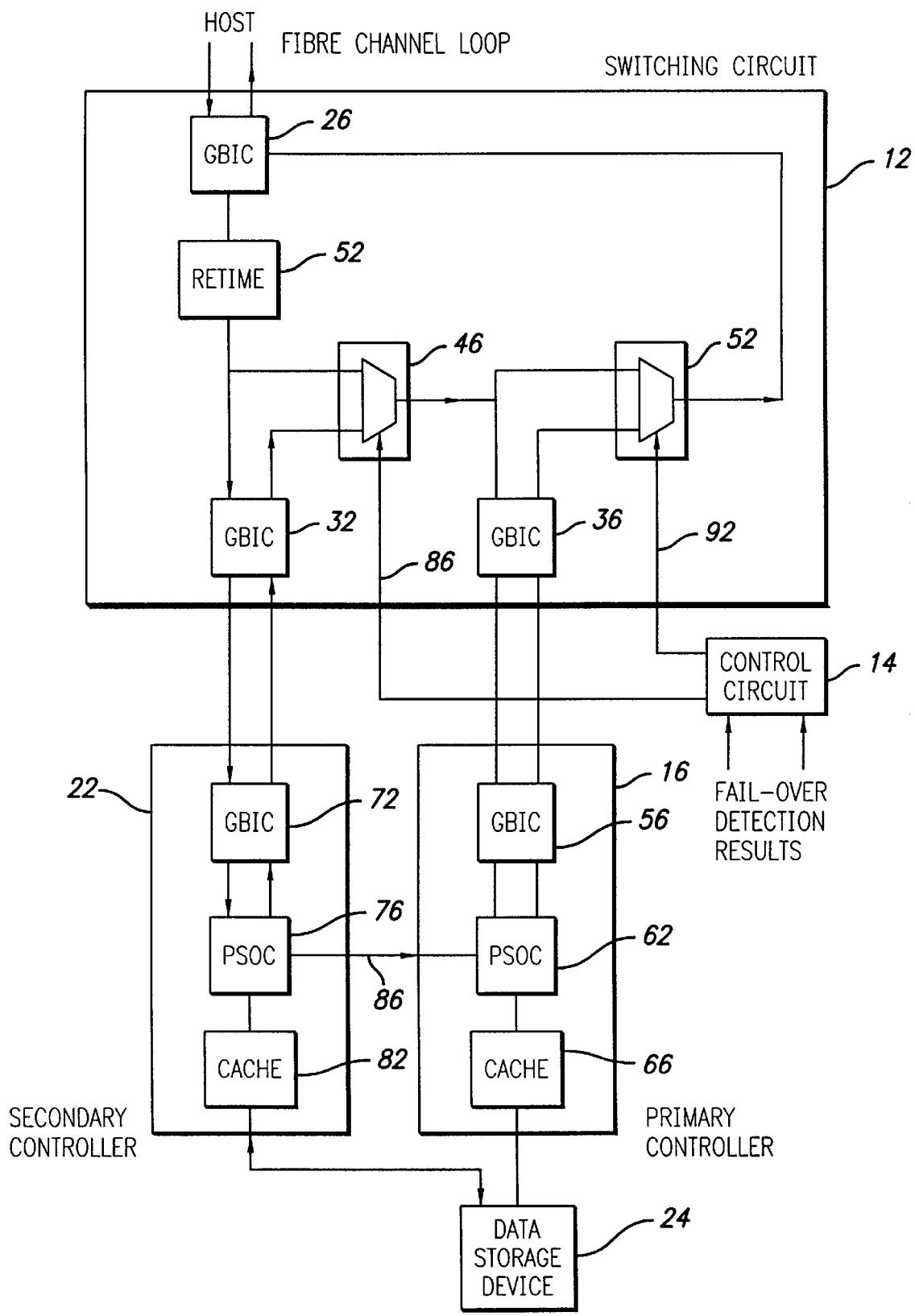
FIG. 2 illustrates a fail-over operation for the embodiment of FIG. 1.

FIG. 2 illustrates a fail-over operation in which a failure occurs in primary controller 16. Such a failure is detected by the fail-over software in each of primary and secondary controllers 16 and 22. Based on the fail-over detection results, control circuit 14 sets multiplexers 52 and 46 such that primary controller 16 is disabled from responding on the loop, and secondary controller 22 which is also connected to data storage device 24 is active on the loop. Since both primary and secondary controllers 16, 22 have the same address and both has access to data storage device 24, the host on the loop does not detect the change of the controller. Also, since controller 16 is disabled, there is no need to fill its cache 66. The data flow is illustrated by the arrows in FIG. 2.

FIG. 3 shows an alternative preferred embodiment of the invention in which two hosts, host 1 and host 2, are communicating with data storage devices 124 and 125 via switching circuit set 110 and controllers 116 and 122 on two fiber channel loops. In this embodiment, switching circuit set 110 is coupled to control circuits 114 and 115, and controllers 116 and 122. Each of controllers 116 and 122 is coupled to both of data storage devices 124 and 125. Switching circuit set 110 includes two switching circuits 111 and 112, each of which is identical to switching circuit 12 in FIG. 1. Each of control circuits 114 and 115 is equivalent to control circuit 14 in FIG. 1. Moreover, each of controllers 116 and 122 is equivalent to the combination of primary and secondary controllers 16 and 22 in FIG. 1. Additionally, each of controllers 116 and 122 includes fail-over software (not shown), such as the Sun Energizer, for detecting whether there is failure in itself, the other controller, or data storage devices 124, 125. The fail-over detection results are sent to control circuits 114 and 115 to control the multiplexers in switching circuits 111 and 112. In this embodiment, controller 116 functions as a primary controller (primary 1) for host 1 and a secondary controller (secondary 2) for host 2. Similarly, controller 122 functions as a primary controller (primary 2) for host 2 and a secondary controller (secondary 1) for host 1. Primary 1 and secondary 1 have the same address, but only one is enabled at a time. Similarly, primary 2 and secondary 2 have the same address, and only one is enabled at a time.

In the normal operation as illustrated in FIG. 3, the multiplexers in switching circuits 111 and 112 are set by control circuits 114 and 115, respectively, so that each of controllers 116 and 122 functions only as a primary controller for respective hosts 1 and 2. In the normal operation, the functions of the secondary controllers in each of controllers 116 and 122 are disabled by the respective multiplexers. The data flows in a similar manner as in FIG. 1, as indicating by the arrows in FIG. 3.

FIG. 4 illustrates a fail-over operation for the embodiment in FIG. 3. If the fail-over software in any of controllers 116, 122 detects a failure in one controller, e.g., controller 122, the fail-over detection results are sent to control circuits 114 and 115. In such case, the multiplexers in switching circuits 111 and 112 are switched by control circuits 114 and 115 so that data directed to failing controller 122 goes to surviving controller 116. In other words, controller 122 is disabled, and controller 116 is active and writes cached data to both data storage devices 124 and 125 for surviving and failing controllers 116 and 122. Since primary 2 in failing controller 122 and secondary 2 in surviving controller 116 have the same address, host 2 does not detect change in the controller and uses the same address to access data storage device 125, regardless of which controller is actually performing the service. In the fail-over operation, the data flows in a similar manner as in FIG. 2, as indicated by the arrows in FIG. 4. The fail-over operation also applies if one of data storage devices 124 and 125 fails.

While the invention has been described in conjunction with specific embodiments, it is evident that many alternatives, modifications and variations will be apparent to those skilled in the art in light of the foregoing description. Accordingly, it is intended to embrace all such alternatives, modifications and variations as fall within the spirit and scope of the appended claims and equivalents.

What is claimed is:

1. An apparatus, responsive to a host, for high availability and caching data storage devices, comprising:
    a primary controller;
    a secondary controller having the same address as that of the primary controller, the secondary controller being linked to the primary controller for synchronization, the synchronization including sending a request by the secondary controller to the primary controller for additional data when there is space available in a buffer of the secondary controller, and after the end of a command it receives, returning a pending status from the secondary controller to the primary controller, wherein synchronization prevents a data over-run condition from occurring;
    a switching circuit coupled to the primary and secondary controllers; and
    a control circuit coupled to the switching circuit such that in a normal operation the control circuit sets the switching circuit so that the primary controller receives and responds to input data supplied from the host and the secondary controller receives the input data, and such that in a fail-over operation in which the primary controller fails the control circuit sets the switching circuit so that the primary controller is disabled and the secondary controller receives and responds to the input data supplied from the host.

2. The apparatus of claim 1,
    wherein the switching circuit includes first and second multiplexers coupled to the primary and secondary controllers, respectively;
    wherein the control circuit switches the first and second multiplexers to control the primary and secondary controllers, respectively, in the normal and fail-over operations.

3. The apparatus of claim 2, wherein the primary controller includes a first cache and the secondary controller includes a second cache.

4. The apparatus of claim 2, further comprising a data storage device coupled to both the primary and secondary controllers.

5. The apparatus of claim 2, wherein the secondary controller is linked to the primary controller for synchronization, and wherein the synchronization prevents a data over-run condition from occurring.

6. A method for providing high availability and caching for data storage devices, comprising the steps of:
    (a) providing a primary controller;
    (b) providing a secondary controller having the same address as that of the primary controller, the secondary controller being linked to the primary controller for synchronization, the synchronization including sending a request by the secondary controller to the primary controller for additional data when there is space available in a buffer of the secondary controller, and after the end of a command it receives, returning a pending status from the secondary controller to the primary controller, wherein synchronization prevents a data over-run condition from occurring;
    (c) coupling a switching circuit to the primary and secondary controllers;
    (d) coupling a control circuit to the switching circuit;
    (e) controlling, in a normal operation, the control circuit to set the switching circuit so that the primary controller receives and responds to input data supplied from a host and the secondary controller receives the input data; and
    (f) controlling, in a fail-over operation in which the primary controller fails, the control circuit to set the switching circuit so that the primary controller is disabled and the secondary controller receives and responds to the input data supplied from the host.

7. The method of claim 6,
    wherein the switching circuit includes first and second multiplexers coupled to the primary and secondary controllers, respectively;
    wherein each of steps (e) and (f) comprises the step of controlling the control circuit to switch the first and second multiplexers to control the primary and secondary controllers, respectively.

8. The method of claim 7, wherein the primary controller includes a first cache and the secondary controller includes a second cache.

9. The method of claim 7, further comprising the step of coupling a data storage device to both the primary and secondary controllers.

10. An apparatus, responsive to first and second hosts, for high availability and caching for data storage devices, comprising:
    a first controller including a first primary controller and a second secondary controller;
    a second controller including a second primary controller and a first secondary controller, wherein the first secondary controller is a backup of the first primary controller and the second secondary controller is a backup of the second primary controller;
    a switching circuit set coupled to the first and second controllers; and
    a control circuit coupled to the switching circuit set; such that in a normal operation, the control circuit sets the switching circuit set so that the first primary controller receives and responds to input data supplied from the first host and the first secondary controller receives the input data from the first host, and the second primary controller receives and responds to input data supplied from the second host and the second secondary controller receives the input data from the second host; and such that in a fail-over operation in which one of the first and second controllers fails and becomes a failing controller and the other of the first and second controllers becomes a surviving controller, the control circuit sets the switching circuit set so that the primary controller in the failing controller is disabled and the secondary controller in the surviving controller receives and responds to the input data directed to the primary controller in the failing controller, and the primary controller in the surviving controller receives and responds to the input data directed to the surviving controller.

11. The apparatus of claim 10, wherein the switching circuit set includes:

a first switching circuit coupled to the first primary controller and the secondary controller in the first controller; and a second switching circuit coupled to the second primary controller and the first secondary controller in the second controller.

12. The apparatus of claim 11, wherein the first switching circuit comprises first and second multiplexers, and the second switching circuit comprises third and fourth multiplexers;

wherein the control circuit includes first and second control circuits;

wherein the first control circuit switches the first and second multiplexers to control the first primary controller and the first secondary controller, respectively, and the second control circuit switches the third and fourth multiplexers to control the second primary controller and the second secondary controller, respectively.

13. The apparatus of claim 12, wherein the first controller includes a first cache coupled to the first primary controller and the second secondary controller;

wherein the second controller includes a second cache coupled to the second primary controller and the first secondary controller.

14. The apparatus of claim 12, further comprising first and second data storage devices each coupled to both first and second controllers.

15. The apparatus of claim 10, wherein the circuitry is a fiber channel circuitry.

16. A computer readable medium including instructions, responsive to a host, for providing high availability and caching for a data storage device, the instructions for:

detecting a failure in a primary controller coupled to the host through a switching circuit;

detecting a failure in a secondary controller coupled to the host through the switching circuit and having the same address as that of the primary controller, the secondary controller being linked to the primary controller for synchronization, the synchronization including sending a request by the secondary controller to the primary controller for additional data when there is space available in a buffer of the secondary controller, and after the end of a command it receives, returning a pending status from the secondary controller to the primary controller, wherein synchronization prevents a data over-run condition from occurring;

detecting a failure in the data storage device; and reporting a failure to the switching circuit via a control circuit, the failure including one of a primary controller failure, and a data storage device failure, so that in a normal operation the control circuit sets the switching circuit so that the primary controller receives and responds to input data supplied from the host and the secondary controller receives the input data; and so that in a fail-over operation in which the primary controller failure occurs the control circuit sets the switching circuit so that the primary controller is disabled and the secondary controller receives and responds to the input data supplied from the host.

* * * * *